United States Patent [19]

Bath et al.

[11] Patent Number: 4,633,574
[45] Date of Patent: Jan. 6, 1987

[54] METHOD FOR SECURING CONDUCTOR BAR IN MACHINE SLOT WHILE CLOSING SLOT

[75] Inventors: Duncan T. Bath; James H. Ferguson, both of Peterborough, Canada

[73] Assignee: Canadian General Electric Co., Ltd., Toronto, Canada

[21] Appl. No.: 717,347

[22] Filed: Mar. 29, 1985

Related U.S. Application Data

[62] Division of Ser. No. 580,315, Feb. 15, 1984, Pat. No. 4,547,690.

[30] Foreign Application Priority Data

Dec. 21, 1983 [CA] Canada ................................. 443885

[51] Int. Cl.4 ........................................... H02K 15/10
[52] U.S. Cl. ..................................... 29/596; 310/214
[58] Field of Search .................. 29/596, 598; 310/214, 310/215

[56] References Cited

U.S. PATENT DOCUMENTS 2,945,140  7/1960  Drabik ................................ 310/214
3,139,550  6/1964  Geer .................................. 310/214

FOREIGN PATENT DOCUMENTS 1095108  2/1981  Canada ............................... 310/214
580351   9/1976  Switzerland ......................... 310/214

Primary Examiner—Carl E. Hall
Attorney, Agent, or Firm—Jerome C. Squillaro

[57] ABSTRACT

A slot closure arrangement for closing the slot opening of slots in the stator of a dynamoelectric machine and for providing a restraining force against conductors in the slot. The slots have opposing notches on opposite sides of the slot adjacent the slot opening. A flat rectangular spring member is placed in the slot opening with the opposite edges of the flat spring member each terminating in one of the opposing notches. A pair of wedges with complementary tapered surfaces is inserted between the spring member and the surface of the conductor in the slot adjacent and facing the slot opening. The wedges are advanced one over the other to increase the overall thickness. The surface of the wedge engaging the spring member has a thickness at the center greater than the thickness at the edges, and the center presses the spring member outwardly when the wedges are advanced, deforming the spring member which then provides a force through the wedges against the conductor in the slot. The spring member not only provides the restraining spring force but it serves as a slot closure member. Because there is no material covering the outer surface of the spring member (except for the extreme edge portions within the notches), nothing impedes heat dissipation from the spring member to the ventilating air.

2 Claims, 8 Drawing Figures

METHOD FOR SECURING CONDUCTOR BAR IN MACHINE SLOT WHILE CLOSING SLOT

This is a division of application Ser. No. 580,315, filed Feb. 15, 1984, now U.S. Pat. No. 4,547,690.

BACKGROUND OF THE INVENTION

This invention relates generally to an improved slot closure for the stator of a dynamoelectric machine, and in particular it relates to an improved slot closure having a transverse spring which forms the closure.

In larger dynamoelectric machines there are slots formed in a stator core which comprises a laminated stack of iron sheets. The slots have winding conductors installed in them and the conductors must be held firmly in place against mechanical, thermal and electromagnetic forces which tend to cause movement. The slots are usually formed with a form of groove or notch, sometimes in the shape of a dove-tail, adjacent the mouth of the slot and a member having a mating configuration is pressed into the slot with the mating edges extending into the groove to close the slot mouth or slot opening. Shims are frequently used between the slot closing member and the conductors as a height adjustment to bring the slot contents up to a desired height.

One of the earlier slot closures is described in Canadian Pat. No. 679,228—Jaun et al issued Feb. 4, 1964. In this patent a slot bridging member of soft iron is inserted into the slot opening with the edges of the slot bridging member extending into notches on either side of the slot opening, and then the slot bridging member is distorted or deformed to cause the edges to press more firmly into the notches and hold the slot bridging member more firmly in place. This slot bridging member of soft iron was intended primarily to regularize the flux pattern and it appears that the retaining of the conductors was not a major consideration.

At the present time, conductors used in larger dynamoelectric machines usually have a jacket formed of a thermosetting resinous material impregnating a porous material, and this is cured to a hard state forming an insulating jacket around the conductor. In addition there may be portions of the jacket coated with a partially conducting elastomer to reduce the possibility of voids developing between the conductors and the slot walls. The elimination or reduction of voids tends to eliminate or reduce corona problems. Conductor arrangements of this type are described in Canadian Pat. No. 1,016,586—Lonseth et al, issued Aug. 30, 1977 to Canadian General Electric Company Limited.

When conductor arrangements as described in the aforementioned Lonseth et al patent are used, they are firmly wedged into their slots to restrain them against movement. However, with time, the possibility of decreased restraining forces has been a problem. Repeated thermal cycling may result in some "bedding in" at the high contact points and some creep or flowing of the materials within the slot. These factors may result in a gradual decrease in height of the slot contents, and if the slot closure system is rigid then the force placed on the slot contents by the slot closure will decrease as the height of the slot contents decreases. The machines presently used may carry considerable current in the conductors and the electromagnetic forces can be quite large and of a vibrational nature, for example, at two times operating frequency. It is very important that the restraining forces should not decrease below a certain level. If the restraining forces decrease enough to permit any vibration, the continuous vibrational forces will eventually cause a major problem.

In order that the restraining forces be maintained, it is known to introduce some form of spring between the slot closure member and the conductors. These springs have been made in various forms and kinds. When a spring is used between a slot closure member and the conductors, there is usually some arrangement to compress or deform the spring so that the spring will in fact exert a force against the closure member on one side and the conductor on the other side.

One prior art arrangement is described in Canadian Pat. No. 980,398—Brown et al, issued Dec. 23, 1975, where two wedge members having complementary tapers are placed in the slot in an overlapping position so that as the wedge members are pressed or advanced towards one another, their overall thickness increases. A spring member in the form of an extended rectangle is also placed in the slot adjacent the wedges. This spring member has transversely extending ripples or deformations to provide a spring action. The two wedge members are pressed together to compress the spring and this exerts the desired force between the slot closure member and the conductors.

Another prior art arrangement is described in Swiss Pat. No. 580,351—Lottanti et al, dated Sept. 30, 1976. This patent shows a slot closure member whose edges engage opposing dove-tail notches in the slot walls. The slot closure member has a longitudinally extending, transversely curved, inner surface. A spring support member has an oppositely curved outer surface. A flat strip of spring material is placed between the mating curved surfaces (not extending into the notches) and is deformed into a similarly curved configuration to provide a force between the slot closure member and the conductors. This arrangement provides for spring forces extending substantially continuously along the length of the slot.

Another arrangement which provides a substantially continuous spring force along the length of the slot, i.e., a line loaded spring, is described in Canadian Pat. No. 1,095,108—Ferguson, issued Feb. 3, 1981, and assigned to Canadian General Electric Company Limited. In this arrangement a transversely curved, longitudinally extending spring member is compressed or flattened by cooperating wedges to provide a spring force between the slot closure member and the conductors.

In the prior art slot closure arrangements which use a spring member, a preferred material for the spring member is often a composite such as a cured epoxy resin with strands of glass fibers embedded therein. Composite materials such as these tend to lose certain of their mechanical properties at elevated temperatures, that is, when they are deflected or deformed and subjected to an elevated temperature they tend to take a permanent set. The tendency increases with temperature. Therefore, it is desirable to keep the temperature of a spring member of composite material as low as possible.

To summarize, dynamoelectric machines of current design may have conductors carrying large currents, and in addition to providing adequate retaining force which would accommodate any shrinkage, it is desirable that the operating temperature of the spring member be as low as possible.

SUMMARY OF THE INVENTION

It is an object of the invention to provide an improved slot closure arrangement.

It is another object of the invention to provide for a dynamoelectric machine, a slot closure of simple design having a spring member which provides the spring force as well as being the slot closure member.

It is yet another object of the invention to provide for a dynamoelectric machine, a slot closure arrangement having improved heat dissipation from the spring member.

In acccordance with one form of the invention a stationary wedge and a driving wedge, having complementary tapered engaging surfaces are placed in a slot with the stationary wedge adjacent the outer surface of the insulated conductor. The drive wedge has an outer facing surface opposite the tapered surface, and the outer surface has a longitudinally extending central portion of greater thickness than the edges. A flat spring member in the shape of an extended reactangle has edges which are received in opposing notches in the core on either side of the slot adjacent the slot opening. The drive wedge is pressed or advanced towards the stationary wedge so that the tapered surfaces slide over one another effectively increasing the overall thickness of the wedges with the central portion of the drive wedge deforming the spring member so that a transverse outwardly extending curvature is formed in the spring member. This provides the desired spring force to restrain the conductors. The flat spring member serves as both the spring and as the slot closure member. The spring member is exposed and has nothing covering its outwardly facing surface which could impede heat dissipation (except, of course, for the minor portion extending within the notches).

Thus there is provided a slot closure arrangement for a dynamoelectric machine having a core comprising a stack of laminations in which slots are provided extending in a substantially axial direction, each slot having opposing notches in either side of said slot adjacent the opening of the slot, and at least one insulated conductor installed in said slot, said slot closure arrangement comprising a flat spring member having side edges each terminating in one of said opposing notches of said slot and extending across said slot opening with an outer exposed surface and an inner surface, and wedge means between said inner surface of said spring member and said conductor, said wedge means having an axially extending central portion on the surface thereof adjacent said inner surface of said spring member of greater thickness than the edges for causing an outward deformation of said flat spring member to provide a spring force inwardly for retaining said conductor.

BRIEF DESCRIPTION OF THE DRAWINGS

The invention will be described with reference to the drawings, in which.

DESCRIPTION OF THE PREFERRED EMBODIMENTS

Figure 1:
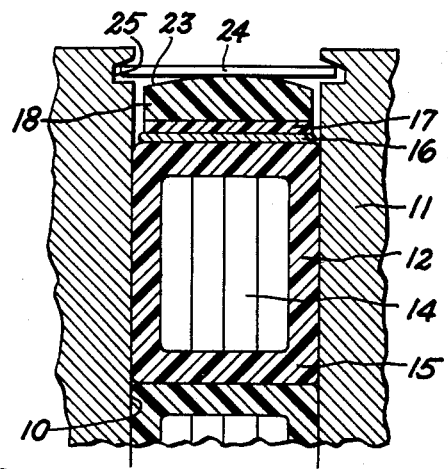
FIG. 1 is a cross-sectional view taken across a portion of a slot of a dynamoelectric machine, showing conductors in the slot and the slot closure according to the invention shown before the wedges are pressed or driven to advance them into their final position.
Figure 2:
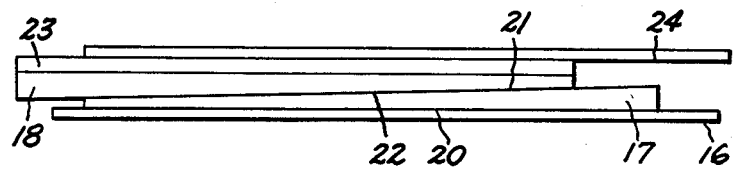
FIG. 2 is a side view of the slot closure arrangement of FIG. 1.

Referring first to FIGS. 1 and 2, there is shown in FIG. 1 a slot 10 in core 11 of a dynamoelectric machine. The slot 10 is one of a plurality of slots formed by punching the stator laminations which comprise core 11. When the laminations are stacked they form conductor-receiving slots which extend axially of the dynamoelectric machine. A conductor bar 12 is shown in the slot. The conductor bar 12 has several conductors 14 surrounded by an insulating jacket 15. The insulating jacket 15 may be formed, for example, by wrapping conductors 14 with a porous material and impregnating the porous material with a thermosetting resin. Depending on the design requirements there may be one or more conductor bars in each slot. FIG. 1 shows one complete conductor bar 12 with a portion of another adjacent bar.

A filler strip 16 is placed on the surface of jacket 15 nearest the opening of slot 10. There may, of course, be more than one filler strip used or there may be no filler strip used. Two wedges are positioned in the slot 10. These may be referred to as the stationary wedge 17 and the driving wedge 18. The stationary wedge 17 has its flat or base surface 20 against filler strip 16 and its tapered surface 21 facing outwardly in the slot. The tapered surface 22 of wedge 18 is in engagement with tapered surface 21 of wedge 17. The outwardly facing surface 23 of wedge 18 has a transverse curve as is readily seen in FIG. 1. The combined closure member and spring member 24 is a flat rectangular strip of spring material positioned with its edges in notches 25 and extending axially along the slot with its inner surface just engaging the curved surface 23 of wedge 18. For convenience, the combined closure member and spring member 24 will be referred to subsequently as a spring member 24.

It will, of course, be apparent that the stationary wedge could be the outer wedge with a curved outer surface, and the driven wedge could be the inner wedge.

Figure 3:
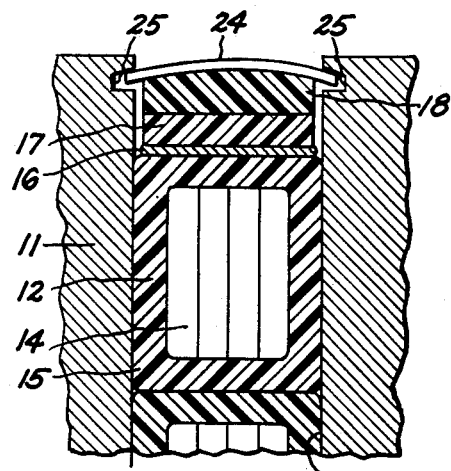
FIG. 3 is a cross-sectional view taken across the portion of a slot of a dynamoelectric machine, similar to FIG. 1, but with the wedges pressed into a finished position.
Figure 4:
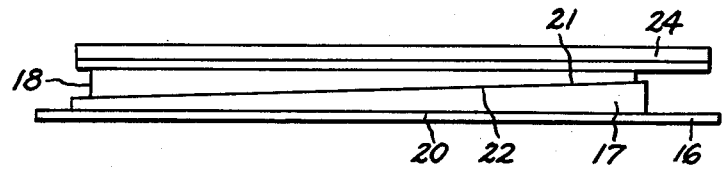
FIG. 4 is a side view of the slot closure arrangement of FIG. 3.

Thus, FIGS. 1 and 2 show the slot closure arrangement of the invention before the driving wedge 18 is advanced axially to deform the spring member 24. When the closure arrangement is being installed, the driving wedge 18 is pressed or driven towards stationary wedge 17 so that the complementary tapered surfaces 21 and 22 slide over one another increasing the overall thickness of the two wedges. The increase in thickness presses the curved surface 23 of driving wedge 18 outwardly against spring member 24, deforming spring member 24. FIGS. 3 and 4 show the slot closure arrangement of the invention with spring member 24 deformed to provide an inwardly directed force against the conductor bars 12 to retain them.

Figure 5:
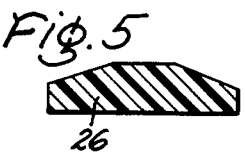
FIGS. 5 and 6 are cross-sectional views of alternate forms of the outer wedge.
Figure 6:
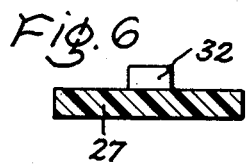

While it may be preferable to have the outer surface 23 of the driving wedge 18 curved to conform to the final or installed shape of spring member 214, this is not essential. The spring member 24 may be pressed outwardly into its curved or deformed configuration by a ridge extending along the outer side of the driving wedge. FIGS. 5 and 6 show cross-sections through driving wedges 26 and 27 respectively. It is understood that these wedges 26 or 27 would replace wedge 18 of FIGS. 1–4. Wedge 26 in FIG. 5 has flat chamfered portions which approximate a desired curvature. The FIG. 5 embodiment can be designed to provide a good approximation to the curvature which the spring member will taken when installed, and it is relatively easy to form. Consequently it is a preferred embodiment of the invention. Wedge 27 of FIG. 6 has a base with a central ridge portion 31 adhered to the surface opposite the tapered surface thereof.

Figure 7:
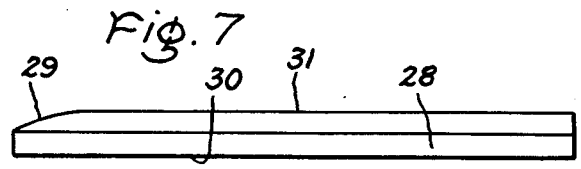
FIGS. 7 and 8 are a side view and an end view of a single wedge for another alternate form of the invention.
Figure 8:
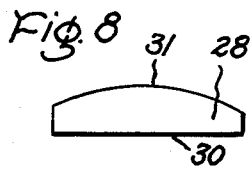

Referring now to FIGS. 7 and 8, there is shown a single wedge 28 having a base 30 with a ridge 31 on the wedging side. There is a sloping or leading portion 29 at one end of the wedge. This form of wedge is used alone, that is, it is not used in complementary pairs. The single wedge 28 would replace both wedges 17 and 18 of FIGS. 1–4. This wedge is pressed into position between filler strips 16 (FIGS. 1–4) and spring member 24 (FIGS. 1–4), to deform the spring member into its desired curved configuration. This is not a preferred form of the invention as it does not provide a controllable increase in the thickness of the tightening members. It does, however, have the advantage of reducing the material between the conductors and the mouth of the slot which may allow more space in the slot for the conductors.

It is also preferred that the notches 25 (FIGS. 1 and 3) have the surface which engages the edge portion of the spring member 24 (FIGS. 1 and 3) shaped with substantially the same form as the edge poriton of the spring member 24 in its fully deflected condition.

It will be noted that in all the embodiments described, the closure member is also the spring member. This spring member is relatively thin and there is nothing on the outwardly facing surface of the spring member to impede heat dissipation as there is, for example, in aforementioned Canadian Pat. No. 1,095,108 or in aforementioned Swiss Pat. No. 580,351.

The spring member 24 (FIGS. 1–4) is preferably a composite material, for example, glass fibres in a thermosetting resinous material. The spring member may use glass fibers or boron fibres, preferably woven into a cloth, and impregnated with a heat resisting, thermosetting, polyester type laminating resin. Several layers of impregnated cloth material are cured under heat and pressure to form flat spring member 24. Instead of glass or boron fibres, aramid fibres, such as poly (p-phenylene terephthalamide) fibres may be used.

It will apparent to those skilled in the art that a plurality of wedges are used along the length of a slot, installed one after the other. The wedges are of a convenient length which may be determined, for example, by factors such as a suitable slope for the wedge pair and the space which the wedge pair must fill between conductor and spring member. It is also convenient to have the spring member of a length related to the length of the wedge pair so that the installation may proceed in a modular manner, that is, a spring member length and a wedge pair are installed and the driving wedge forced home to achieve the desired final curvature of the spring member, then an adjacent spring member length and wedge pair are installed, and so on.

It is believed the invention as described herein in its various forms provides an advance over the prior art, and that other forms may also come within the scope of the invention.

The embodiments of the invention in which an exclusive property or privilege is claimed are defined as follows:

1. A method for securing a conductor bar in a slot of a dynamoelectric machine and closing the opening of said slot, said slot having opposing notches adjacent said opening, comprising:

inserting a wedge in said slot, said wedge having on one surface thereof an axially extending central portion of greater thickness than the side edges of said wedge;

inserting a flat spring member into the slot opening, the side edges of said spring member terminating in said notches, said flat spring member engaging said central portion of greater thickness; and advancing said wedge in said slot to deform the central portion of said spring member outwardly, thereby providing an inwardly directed spring force to retain said conductor bar and closing said slot opening while maintaining the outwardly facing surface of said spring member exposed, thereby not impeding heat dissipation from said spring member.

2. A method for securing a conductor bar in a slot of a dynamoelectric machine and closing the opening of said slot, said slot having opposing notches adjacent said opening, comprising:

inserting a pair of wedges having complementary tapered surfaces in said slot with said tapered surfaces in engagement, the base surface opposite the tapered surface of one of said wedges engaging the conductor bar and the surface opposite the tapered surface of the other wedge having an axially extending central portion of greater thickness than the side edges of said wedge;

inserting a flat spring member into the slot opening, the side edges of said spring member terminating in said notches, said flat spring member engaging said central portion of greater thickness; and forcing at least one of said wedges over the other of said wedges causing the tapered surfaces to slide one over the other to increase the overall thickness of said wedges and to thereby cause said spring member to deform, said spring member in its deformed condition providing an inwardly directed spring force to retain said conductor bar and also serving as a slot closure member, while maintaining the outwardly facing surface of said spring member exposed, thereby not impeding heat dissipation from said spring member.

* * * * *